(12) United States Patent
Kim et al.

(10) Patent No.: US 8,935,045 B2
(45) Date of Patent: Jan. 13, 2015

(54) APPARATUS AND METHOD FOR CONTROLLING VIDEO RECORDING IN BLACK BOX FOR VEHICLE

(75) Inventors: Heungwon Kim, Seoul (KR); Seungwan Woo, Seoul (KR); Wonkeun Lee, Gyunggi-do (KR); Haeil Lee, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 232 days.

(21) Appl. No.: 13/519,718

(22) PCT Filed: Jan. 24, 2011

(86) PCT No.: PCT/KR2011/000478
§ 371 (c)(1),
(2), (4) Date: Aug. 15, 2012

(87) PCT Pub. No.: WO2011/093624
PCT Pub. Date: Aug. 4, 2011

(65) Prior Publication Data
US 2012/0303215 A1 Nov. 29, 2012

(30) Foreign Application Priority Data

Jan. 26, 2010 (KR) .................. 10-2010-0006954
Jan. 26, 2010 (KR) .................. 10-2010-0006970
Jan. 26, 2010 (KR) .................. 10-2010-0006983

(51) Int. Cl.
| G06F 7/00 | (2006.01) |
| B60Q 1/00 | (2006.01) |
| G09G 5/00 | (2006.01) |
| B62D 41/00 | (2006.01) |
| G01D 9/00 | (2006.01) |

(52) U.S. Cl.
CPC ............... *B62D 41/00* (2013.01); *G01D 9/005* (2013.01)

USPC .............................. 701/36; 340/436; 345/634

(58) Field of Classification Search
CPC .................. G08B 13/19647; G08B 13/19673; G08B 13/19669; G08B 13/19695; G08B 13/19632; G08B 13/19641; G08B 13/19671; G08B 13/19667; G08B 13/19656; G08B 15/001; B60R 11/02; B60R 11/0211; B60R 11/04; B60R 11/0235; B60R 2011/0085; B60R 2001/1253; B60R 2011/0288
USPC ................... 701/9, 36, 45, 301, 302, 49, 409; 340/436, 438, 988–996; 345/619, 634
See application file for complete search history.

(56) References Cited

U.S. PATENT DOCUMENTS

2006/0249660 A1* 11/2006 Huang et al. ............ 250/214 AL
2008/0267222 A1* 10/2008 Leung et al. .................. 370/503

FOREIGN PATENT DOCUMENTS

| JP | 2003-067875 | * | 3/2003 |
| JP | 2008-186174 | | 8/2008 |

(Continued)

OTHER PUBLICATIONS

International Search Report, PCT Application No. PCT/KR2011/000478, mailed Oct. 19, 2011 (2 pages).

*Primary Examiner* — Muhammad Shafi
(74) *Attorney, Agent, or Firm* — Fox Rothschild, LLP

(57) ABSTRACT

Provided are an apparatus and a method for controlling a video recording in a black box for vehicle. The method for controlling the video recording in the black box for a vehicle according to the present invention, for example, comprises the steps of: storing a video including images of a driving vehicle; obtaining the possibility of an accident with the vehicle; and variably adjusting one or more image quality, resolution, and a frame accident possibility. The limited capacity of storage can be used by adopting the configuration. In addition, the monitoring and storage performance of the black box for a vehicle can be improved by correctly determining causes of a vehicle accident.

18 Claims, 20 Drawing Sheets

(56) References Cited

FOREIGN PATENT DOCUMENTS

| KR | 10-0719216 | * | 1/2007 |
| KR | 10-0719216 |   | 5/2007 |
| KR | 10-0929689 |   | 3/2009 |
| KR | 10-0929689 | * | 12/2009 |

* cited by examiner

FIG.12
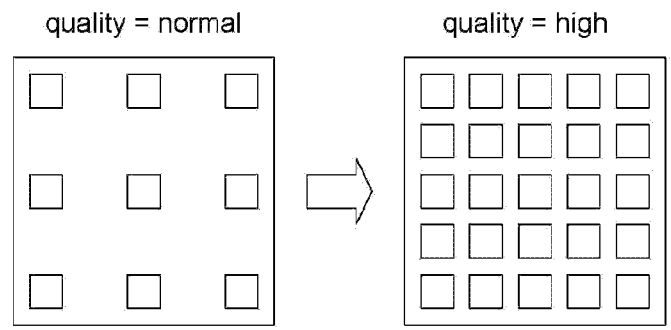
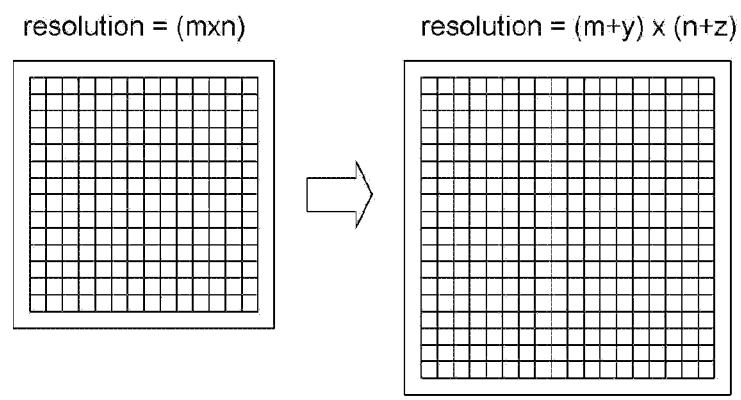
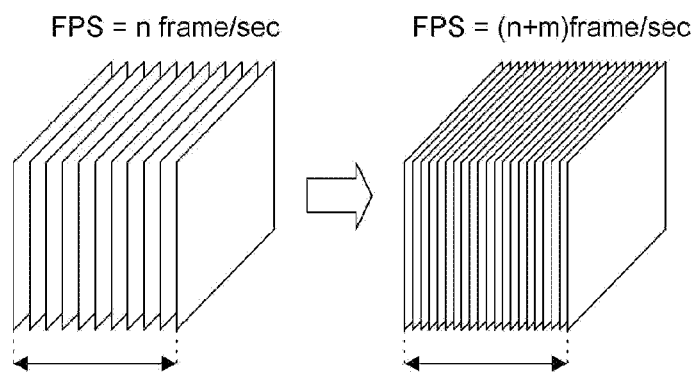

FIG.18
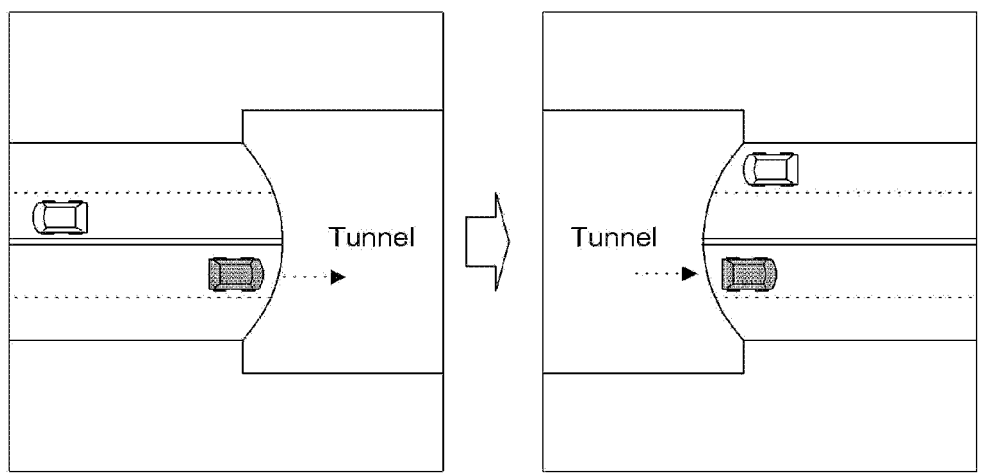
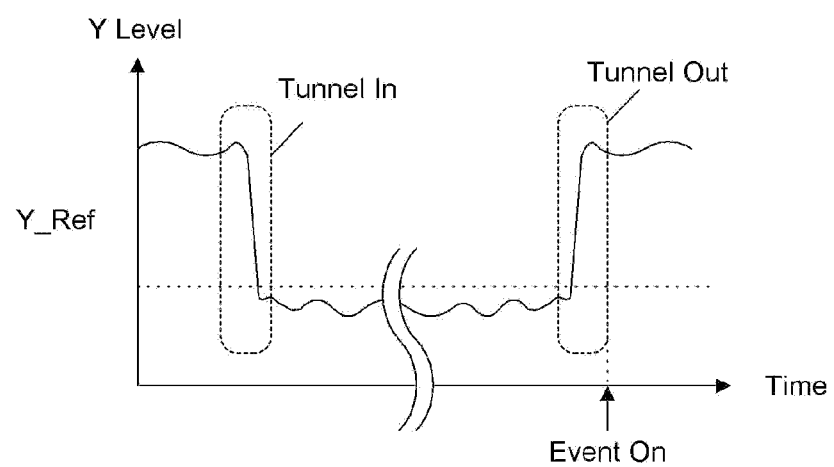

FIG.19
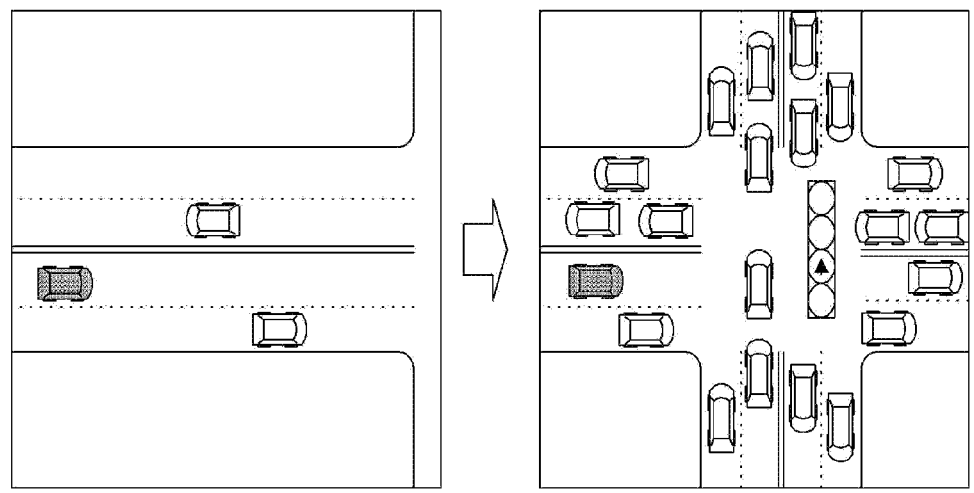
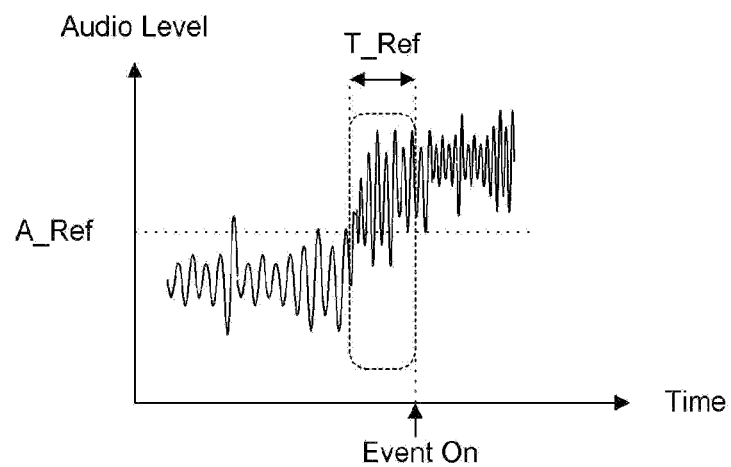

APPARATUS AND METHOD FOR CONTROLLING VIDEO RECORDING IN BLACK BOX FOR VEHICLE

CROSS REFERENCE TO RELATED APPLICATIONS

This application is the national entry under 35 USC 371 for PCT/KR2011/000478, filed Jan. 24, 2011, which claims priority to Korean Application No. 10-2010-0006983, filed Jan. 26, 2010, Korean Application No. 10-2010-0006970, filed Jan. 26, 2010, and Korean Application No. 10-2010-0006954, filed Jan. 26, 2010. The contents of the foregoing applications are incorporated herein by reference.

TECHNICAL FIELD

The present invention relates to an apparatus and method for controlling video recording in a black box for a vehicle. More specifically, the invention relates to an apparatus and method for controlling video recording, which are applied to a vehicle black box connected to a vehicle navigation system through wired or wireless communication.

BACKGROUND ART

With the popularization of the Internet and modification of location information related laws, location based service (LBS) related industries are activated. As one of location based services, a vehicle navigation service which measures a current location of a vehicle or guides a route to a destination is also rapidly activated.

To judge the negligence in an accident occurring when a vehicle stops or runs, objective data is needed in many cases. Accordingly, a vehicle black box capable of providing the objective data is used. However, a conventional vehicle black box provides only simple and superficial information about a vehicle state and cannot effectively meet the demands of users.

DETAILED DESCRIPTION OF THE INVENTION

Technical Problems

An object of the present invention is to provide an apparatus and method for controlling video recording in a vehicle black box connected to a vehicle navigation system through wired or wireless communication, which record an image captured by a camera in a storage by increasing one or more of the quality, resolution and frame per second (FPS) of the recorded image when the possibility of a car accident is high.

Technical Solutions

According to an aspect of the present invention, an apparatus for controlling video recording in a black box for a vehicle includes: a storage for storing a video including images of a driving vehicle; and a controller for obtaining the possibility of an accident with the vehicle and variably adjusting one or more of the quality, resolution and frame per second (FPS) of the video according to the obtained accident possibility.

According to another aspect of the present invention, a method for controlling video recording in a black box for a vehicle includes: storing a video including images of a driving vehicle; obtaining the possibility of an accident with the vehicle; and variably adjusting one or more of the quality, resolution and FPS of the video according to the obtained accident possibility.

Advantageous Effects

The apparatus and method for controlling video recording according to the present invention are applied to a vehicle black box connected with a vehicle navigation system through wired or wireless communication. The apparatus and method for controlling video recording in the vehicle black box record an image captured by a camera in a storage by increasing one or more of the quality, resolution and frame per second (FPS) of the recorded image when the possibility of a car accident is high. Accordingly, the limited capacity of the storage can be used. In addition, the monitoring and storage performance of the vehicle black box can be improved by correctly determining causes of a vehicle accident.

BRIEF DESCRIPTION OF THE DRAWINGS

FIG. 12 illustrates an operation of variably adjusting the quality, resolution and FPS of a camera video according to an embodiment of the present invention;

FIGS. 18, 19 and 20 are views for explaining detection of a traffic congestion state according to another embodiment of the present invention.

BEST MODE FOR CARRYING OUT THE INVENTION

According to an aspect of the present invention, an apparatus for controlling video recording in a black box for a vehicle includes: a storage for storing a video including images of a driving vehicle; and a controller for obtaining the possibility of an accident with the vehicle and variably adjusting one or more of the quality, resolution and frame per second (FPS) of the video according to the obtained accident possibility.

According to another aspect of the present invention, a method for controlling video recording in a black box for a vehicle includes: storing a video including images of a driving vehicle; obtaining the possibility of an accident with the vehicle; and variably adjusting one or more of the quality, resolution and FPS of the video according to the obtained accident possibility.

Modes for Invention

Now, the above and other aspects of the present invention will be described in detail through preferred embodiments with reference to the accompanying drawings so that the present invention can be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims. In the following description of the present invention, a detailed description of known functions and configurations incorporated herein will be omitted when it may obscure the subject matter of the present invention. The same reference numbers will be used throughout this specification to refer to the same or like parts. Further, numerals (e.g. first, second, etc.) used to describe the present invention are merely identifiers for discriminating one component from other components.

A navigation system according to the present invention will now be described in detail with reference to the attached drawings. The terms "module" and "part" used to signify components are used herein to help the understanding of the components and thus they should not be considered as having specific meanings or roles.

Figure 1:
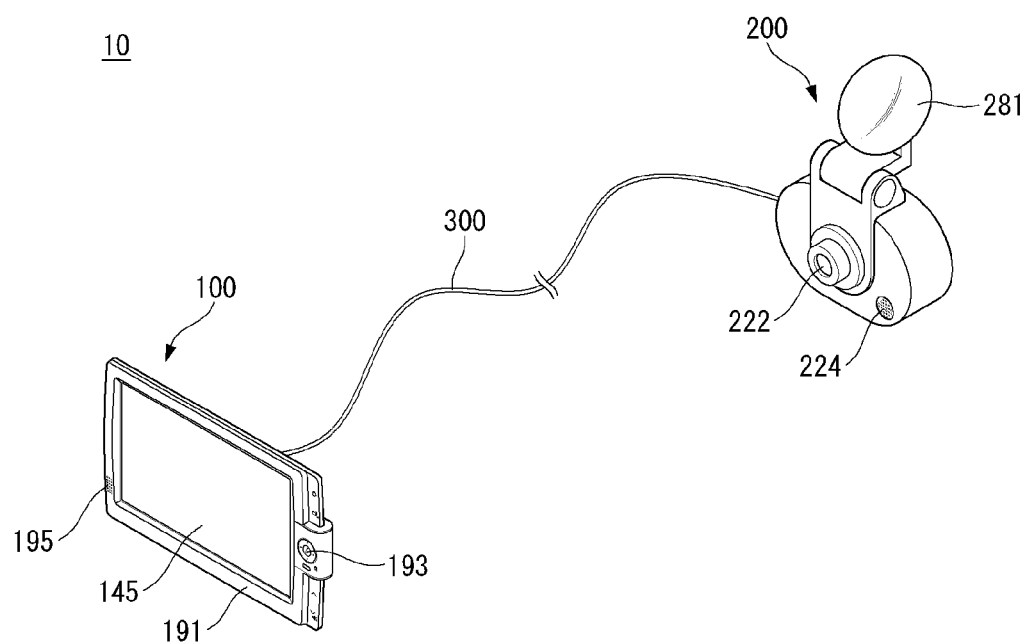
FIG. 1 illustrates a navigation system according to an embodiment of the present invention.

FIG. 1 illustrates a navigation system according to an embodiment of the present invention.

Referring to FIG. 1, the navigation system 10 according to an embodiment of the present invention may include a vehicle navigation system 100 and a vehicle black box 200.

The navigation system 10 may be a system that informs a driver or a passenger of a vehicle of data involving driving and maintenance of the vehicle. The navigation system 10 may be the vehicle navigation system 100 in a narrow sense and may be a system including various electronic devices connected with the vehicle navigation system 100 by wire or wirelessly in a broad sense.

That is, electronic devices capable of complementing and augmenting the function of the vehicle navigation system 100 can be connected with the vehicle navigation system 100 to implement the integrated navigation system 10. The electronic devices capable of implementing the navigation system 10 by being connected with the vehicle navigation system 100 may include a mobile terminal that can be linked to a mobile communication network, a remote controller, etc.

Furthermore, the electronic devices may include the vehicle black box 200. The vehicle black box 200 may be integrated with or separated from the vehicle navigation system 100. While FIG. 1 shows that the vehicle black box 200 is provided separately from the vehicle navigation system 100 and connected with the vehicle navigation system 100 through a communication cable 300, the vehicle black box 200 can be integrated with the vehicle navigation system 100.

The vehicle navigation system 100 may include a display 145 attached to the front of a navigation housing 191, a navigation operation key 193, and a navigation microphone 195.

The navigation housing 191 forms the external appearance of the vehicle navigation system 100. The vehicle navigation system 100 may be exposed to various external environments such as high or low temperature for seasonal reason, direct/indirect external shocks, etc. The navigation housing 191 may protect internal electronic components of the vehicle navigation system 100 from external environment variations and make the external appearance of the vehicle navigation system 100 beautiful. To achieve this, the navigation housing 191 may be formed by injection molding using a material such as ABS, PC or reinforced engineering plastics.

The display 145 visually displays various types of data. Data displayed on the display 145 may include map data combined with route data, images of broadcast programs including DMB broadcast programs, and images stored in a memory. The display 145 may be divided into several regions physically or logically.

Physically divided displays mean two or more displays connected to each other. Logically divided displays mean a display of a plurality of independent screens on one physical display 145. For example, route data is displayed on part of the display 145 while a received DMB broadcast program is displayed on the display 145, or a map and the DMB broadcast program are respectively displayed on different regions of the display 145.

With the tendency of convergence of various functions into the vehicle navigation system 100, the display 145 is increasingly logically divided to display various types of data. Furthermore, to display a large amount of various types of data, the screen of the display 145 becomes larger.

All or some of the surface of the display 145 may be a touchscreen capable of receiving a touch input from a user. For example, the touchscreen function can be activated by touching a function selection button displayed on the display 145. That is, the display 145 can function as both an output unit 140 shown in FIG. 3 and an input unit 120 shown in FIG. 3.

The navigation operation key 193 may be provided to execute various functions of the vehicle navigation system 100 or to allow a user to directly input necessary data. Frequently used specific functions may be mapped to the navigation operation key 193 to improve user convenience.

The navigation microphone 195 may be provided to receive sounds including voices. For example, a specific function of the navigation device 100 can be executed on the basis of a voice signal received through the navigation microphone 195. Furthermore, it is possible to detect a current state of the vehicle, such as an accident, on the basis of a sound signal received through the navigation microphone 195.

The vehicle block box 200 may store data necessary for a procedure of dealing with an accident by exchanging signals with the vehicle navigation system 100. For example, When an accident occurs while the vehicle runs, it is possible to analyze an image acquired by the vehicle black box 200 and use the image to determine the details of the accident and a degree of the accident. Furthermore, the vehicle black box 200 connected to the vehicle navigation system 100 can use data stored in the vehicle navigation system 100. For example, it is possible to map images obtained from the vehicle black box 200 with map data stored in the vehicle navigation system 100 to improve the utility of the vehicle black box 200.

The vehicle black box 200 can obtain data on the vehicle when the vehicle runs or stops. That is, the vehicle black box 200 can capture an image not only when the vehicle runs but also when the vehicle stops. The quality of an image obtained through the vehicle black box 200 may be fixed or variable. For example, the picture quality can be increased in the event of an accident and decreased in a normal case so as to store a salient image while minimizing a necessary storage space.

The vehicle black box 200 may include a black box camera 222, a black box microphone 224, and an attachment part 281.

The black box camera 222 can take pictures of the inside and outside of the vehicle. The vehicle black box 200 may include one or more black box cameras 222.

When the vehicle black box 200 include a plurality of black box cameras 222, one of the black box cameras 222 may be integrated with the vehicle black box 200 and others may be attached to portions of the vehicle to capture images and transmit the captured images to the vehicle black box 200. When the vehicle block box 200 includes one black box camera 222, the black box camera 222 may be installed such that it can photograph a forward view of the vehicle. Images captured by the black box camera 222 may be stored in the vehicle black box 200 or the vehicle navigation system 100.

The black box microphone 224 may acquire a sound generated from the inside or outside of the vehicle. The black box microphone 224 may execute functions similar to those of the above-mentioned navigation microphone 195.

The attachment part 281 may fix the vehicle black box 200 to the vehicle. The attachment part 281 may be a suction plate capable of attaching the vehicle black box 200 to the windshield of the vehicle or a fixing device capable of combining the vehicle black box 200 with the room mirror of the vehicle.

Figure 2:
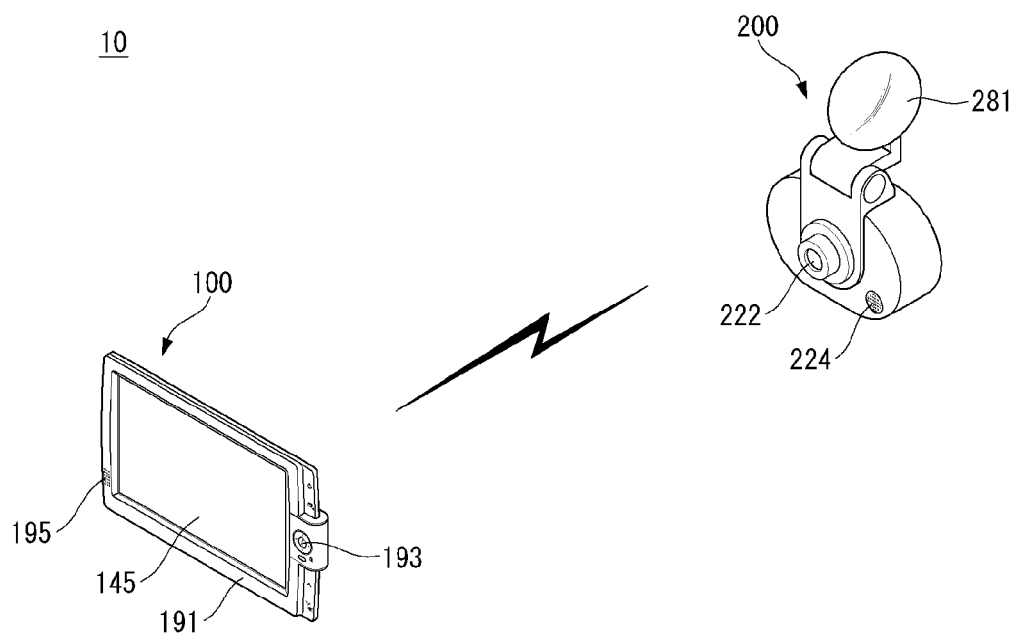
FIG. 2 illustrates a navigation system according to another embodiment of the present invention.

FIG. 2 illustrates a navigation system according to another embodiment of the present invention. Only parts different from the above-described embodiment will now be described.

The navigation system 10 according to another embodiment of the present invention may be wirelessly connected to the vehicle navigation system 100 and the vehicle block box 200. That is, the vehicle navigation system 100 and the vehicle black box 200 may be separate devices having no physical connecting device therebetween. The vehicle navigation system 100 and the vehicle black box 200 may communicate with each other through Bluetooth, RFID (Radio Frequency Identification), IrDA (Infrared Data Association), UWB (Ultra WideBand), ZigBee, etc.

Figure 3:
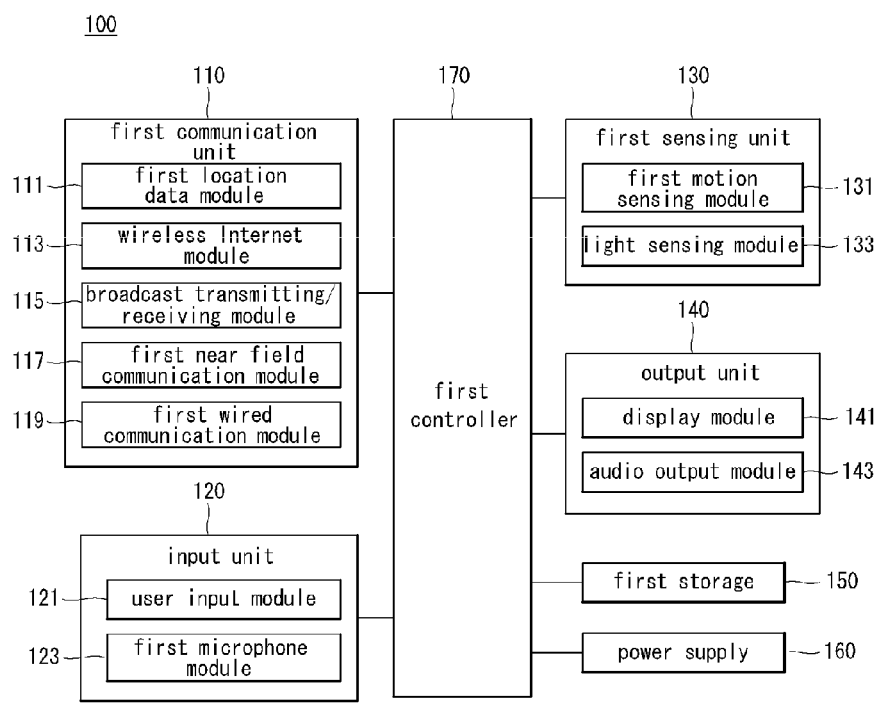
FIG. 3 is a block diagram of a vehicle navigation system shown in FIG. 1.

FIG. 3 is a block diagram of the vehicle navigation system 100 shown in FIG. 1.

Referring to FIG. 3, the vehicle navigation system 100 according to an embodiment of the present invention may include a first communication unit 110, an input unit 120, a first sensing unit 130, an output unit 140, a first storage 150, a power supply 160, and a first controller 170.

The first communication unit 110 is provided for the vehicle navigation system 100 to communicate with other devices. The first communication unit 110 may include a location data module 111, a wireless Internet module 113, a broadcast transmitting/receiving module 115, a first near field communication module 117, and a first wired communication module 119. The location data module 111 acquires location data through a GNSS (Global Navigation Satellite System). The GNSS is a navigation system that calculates the location of a receiver terminal using a radio signal received from an artificial satellite (20 shown in FIG. 5). Examples of the GNSS may include GPS (Global Positioning System), Galileo, GLONASS (Global Orbiting Navigational Satellite System), COMPASS, IRNSS (Indian Regional Navigational Satellite System), QZSS (Quasi-Zenith Satellite System), etc. The location data module 111 of the vehicle navigation system 100 may obtain location data by receiving a GNSS signal provided in an area where the vehicle navigation system 100 is used.

The wireless Internet module 113 acquires data or by accessing wireless Internet or transmits data. The wireless Internet accessible by the wireless Internet module 113 may include WLAN (Wireless LAN), WiBro (Wireless Broadband), Wimax (World interoperability for microwave access), HSDPA (High speed Downlink Packet Access), etc.

The broadcast transmitting/receiving module 115 transmits/receives broadcast signals through broadcasting systems. The broadcasting systems may include DMBT (Digital Multimedia Broadcasting Terrestrial), DMSS (Digital Multimedia Broadcasting Satellite), MediaFLO (Media Forward Link Only), DVBH (Digital Video Broadcast Handheld), ISDBT (Integrated Services Digital Broadcast Terrestrial), etc. Broadcast signals transmitted/received through the broadcast transmitting/receiving module 115 may include traffic data, living data, etc.

The first near field communication module 117 is a device for near field communication. The first near field communication module 117 can perform communication through Bluetooth, RFID, IrDA, UWB, ZigBee, etc.

The first wired communication module 119 is an interface capable of connecting the vehicle navigation system 100 to other devices by wire. The first wired communication module 119 may be a USB module capable of performing communication through a USB port. The vehicle navigation system 100 according to embodiments of the present invention can communicate with other devices through the first near field communication module 117 or the first wired communication module 119. Furthermore, when the vehicle navigation system 100 communicates with a plurality of devices, the vehicle navigation system 100 may communicate with one of the devices through the first near field communication module 117 and communicate with the other through the first wired communication module 119.

The input unit 120 converts an external physical input applied to the vehicle navigation system 100 into an electric signal. The input unit 120 may include a user input module 121 and a first microphone module 123.

The user input module 121 is a key input unit through which a user can apply an input through a push operation. The user input module 121 may be implemented as the navigation operation key (193 shown in FIG. 1) provided to the exterior of the housing (191 shown in FIG. 1) of the vehicle navigation system 100.

The first microphone module 123 receives a user voice and a sound generated from the inside or outside of the vehicle. The first microphone module 123 may be implemented as the navigation microphone (195 shown in FIG. 1) provided to the exterior of the housing (191 shown in FIG. 1) of the vehicle navigation system 100.

The first sensing unit 130 senses a current state of the vehicle navigation system 100. The first sensing unit 130 may include a first motion sensing module 131 and a light sensing module 133.

The first motion sensing module 131 may sense a three-dimensional motion of the vehicle navigation system 100. The first motion sensing module 131 may include a 3-axis geomagnetic sensor and a 3-axis acceleration sensor. It is possible to calculate a more accurate trace of the vehicle equipped with the vehicle navigation system 100 by combining motion data acquired through the first motion sensing module 131 with location data obtained through the location data module 111.

The light sensing module 133 measures surrounding illuminance of the vehicle navigation system 100. It is possible to control the brightness of the display 145 to be varied with the surrounding illuminance using illuminance data acquired through the light sensing module 133.

The output unit 140 outputs data regarding the vehicle navigation system 100. The output unit 140 may include a display module 141 and an audio output module 143.

The display module 141 outputs visually recognizable information about the vehicle navigation system 100. The display module 141 may be implemented as the display (145 shown in FIG. 1) provided to the front of the housing (191 shown in FIG. 1) of the vehicle navigation system 100. If the display module 141 is a touchscreen, the display module 141 can function as both the output unit 140 and the input unit 120, as described above.

The audio output module 143 outputs auditorily recognizable data regarding the vehicle navigation system 100. The audio output module 143 may be implemented as a speaker outputting data that needs to be signaled to users including a driver as sound.

The first storage 150 stores data necessary for operation of the vehicle navigation system 100 and data generated according to the operation. The first storage 150 may be a memory built in the vehicle navigation system 100 or a detachable memory. The data necessary for the operation of the vehicle navigation system 100 may include an OS, route search application, map, etc. The data generated according to the operation of the vehicle navigation system 100 may include information about a searched route, a received image, etc.

The power supply 160 supplies power necessary for the operation of the vehicle navigation system 100 or operations of other devices connected to the vehicle navigation system 100. The power supply 160 may be a device provided with power from a battery set in the vehicle navigation system 100 or an external power supply. The power supply 160 may be implemented as the first wired communication module 119 or a device wirelessly provided with power, according to power supply form.

The first controller 170 outputs control signals for controlling operations of the vehicle navigation system 100. Furthermore, the first controller 170 may output control signals for controlling other devices connected to the vehicle navigation system 100.

Figure 4:
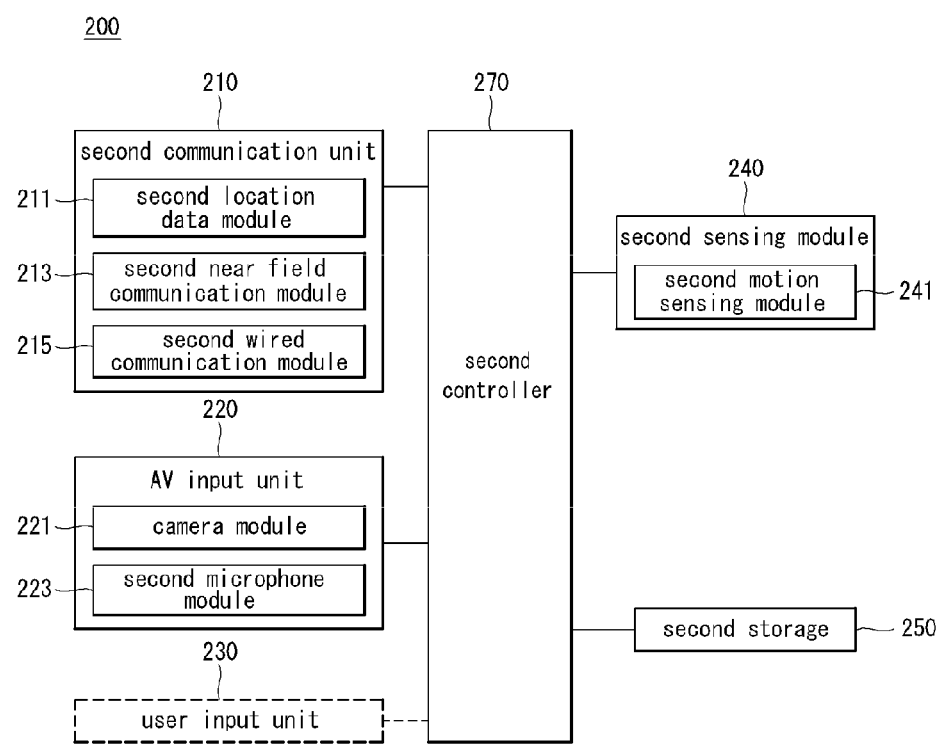
FIG. 4 is a block diagram of a vehicle block box shown in FIG. 1.

FIG. 4 is a block diagram of the vehicle black box 200 shown in FIG. 1.

Referring to FIG. 4, the vehicle black box 200 according to an embodiment of the present invention may include a second communication unit 210, an AV input unit 220, a user input unit 230, a second sensing unit 240, and a second storage 250.

The second communication unit 210 may communicate with the first communication unit 110 of the vehicle navigation system (100 shown in FIG. 3) or other devices. The second communication unit 210 may include a second location data module 211, a second near field communication module 213, and a second wired communication module 215. The second near field communication module 213 can communicate with the first near field communication module (117 shown in FIG. 3) and the second wired communication module 215 can communicate with the first wired communication module (119 shown in FIG. 3).

The AV input unit 220 may acquire sounds and images. The AV input unit 220 may include a camera module 221 and a second microphone module 223.

The camera module 221 may capture images of the inside and outside of the vehicle equipped with the vehicle black box 200. The camera module 221 may be implemented as the black box camera (222 shown in FIG. 1), as described above.

The second microphone module 223 may obtain sounds generated from the inside and outside of the vehicle. The sounds obtained through the second microphone module 223 may be used to control operation of the vehicle black box 200. For example, when a sound with higher intensity is received through the second microphone module 223, the camera module 221 can be controlled to capture an image with higher resolution. The second microphone module 223 may be implemented as the black box microphone 224.

The user input unit 230 is a device through which a user directly operates the vehicle black box 200. The user input unit 230 may be implemented as a push button (not shown) provided to the exterior of the vehicle black box 200. If the vehicle black box 200 is controlled by a control signal of the first controller (170 shown in FIG. 3) of the vehicle navigation system (100 shown in FIG. 3), the user input unit 230 may be excluded from the vehicle black box 200.

The second sensing unit 240 may sense a current state of the vehicle black box 200. The second sensing unit 240 may include a second motion sensing module 241 and performs an operation similar to that of the first motion sensing module (131 shown in FIG. 3). If the second sensing unit 240 is included in the vehicle black box 200, the second sensing unit 240 may not receive information about a three-dimensional motion from the vehicle navigation device 100.

The second storage 250 stores information necessary for operations of the vehicle black box 200 and information generated according to the operations of the vehicle black box 200. The information stored in the second storage 250 may be images captured by the camera module 221. The second storage 250 may be included in the vehicle black box 200 or may be a memory detachably set in the vehicle black box 200.

The second controller 270 outputs control signals for controlling operations of the vehicle black box 200. The second controller 270 may be affected by control signals of the first controller (170 shown in FIG. 3) of the vehicle navigation system (100 shown in FIG. 3). That is, the second controller 270 may be dependent on the first controller (170 shown in FIG. 3).

Figure 5:
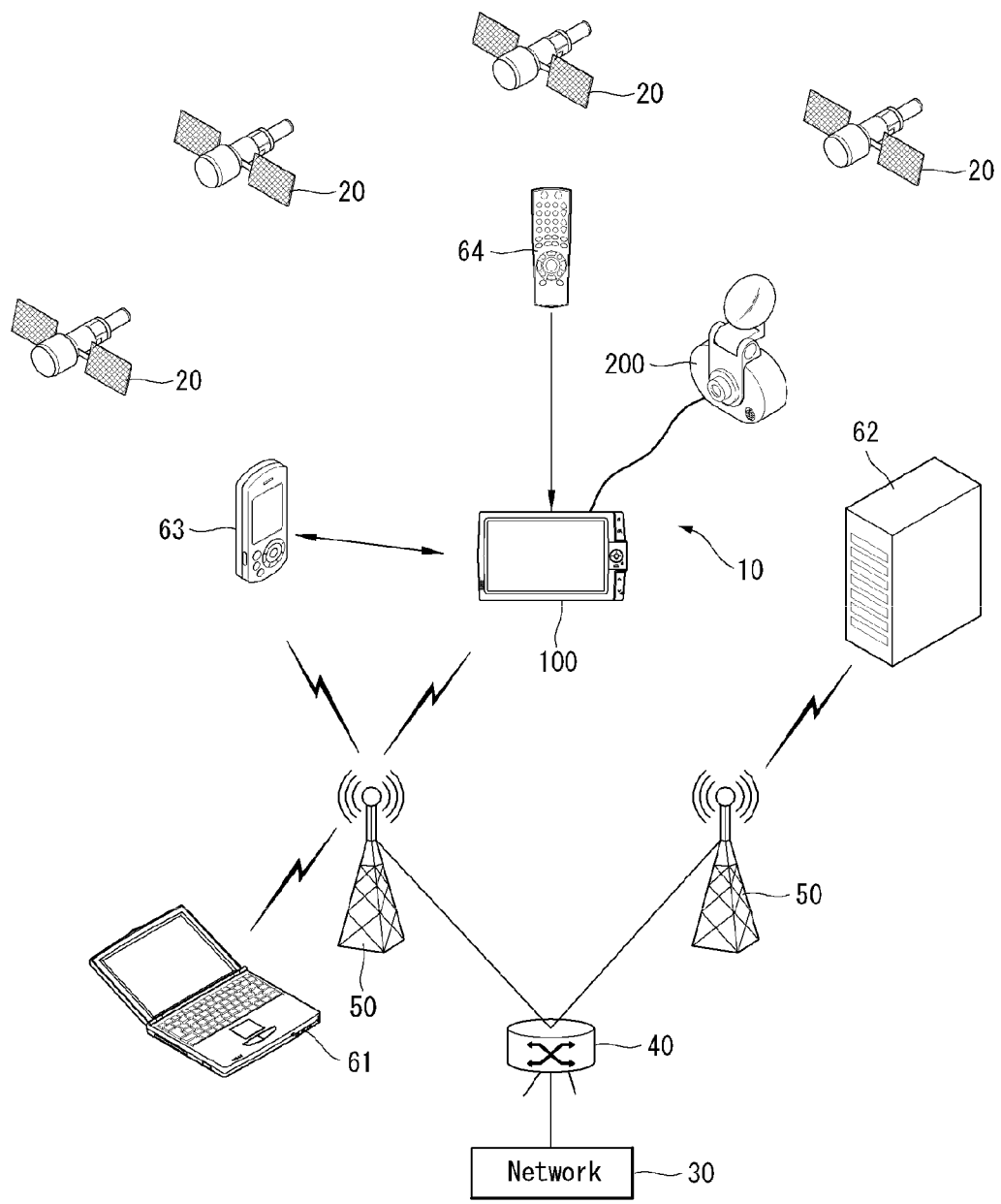
FIG. 5 illustrates a configuration of a communication network including the navigation system shown in FIG. 1.

FIG. 5 illustrates a configuration of a communication network including the navigation system 10 shown in FIG. 1.

Referring to FIG. 5, the navigation system 10 according to an embodiment of the present invention may be linked with various communication networks and other electronic devices 61 to 64.

The navigation system 10 may calculate a current location thereof using radio signals received from artificial satellites 20. The artificial satellites 20 may transmit L-band frequency signals having different frequency bands. The navigation system 10 can calculate the current location thereof on the basis of a time required for the L-band frequency transmitted from each artificial satellite 20 to arrive at the navigation system 10.

The navigation system 10 may wirelessly access a network 30 through a control station (ACR) 40 and a base station (RAS) 50 via the first communication unit (110 shown in FIG. 3). When the navigation system 10 is linked with the network 30, the navigation system 10 can exchange information with the electronic devices 61 and 62 linked to the network 30 by being indirectly with the electronic devices 61 and 62.

The navigation system 10 may indirectly access the network 30 through another device 63 having a communication function. For example, if the navigation system 10 does not include a device through which the navigation system 10 access the network 30, the navigation system 10 can communicate with the other device 63 having the communication function through the first near field communication module (117 shown in FIG. 3) or the like.

An apparatus and method for controlling video recording in a vehicle black box according to embodiments of the present invention will now be described in detail.

The first controller 170 of the vehicle navigation system 100 and the second controller 270 of the vehicle black box 200 perform an interface operation through a near field communication module or a wired communication module.

Figure 6:
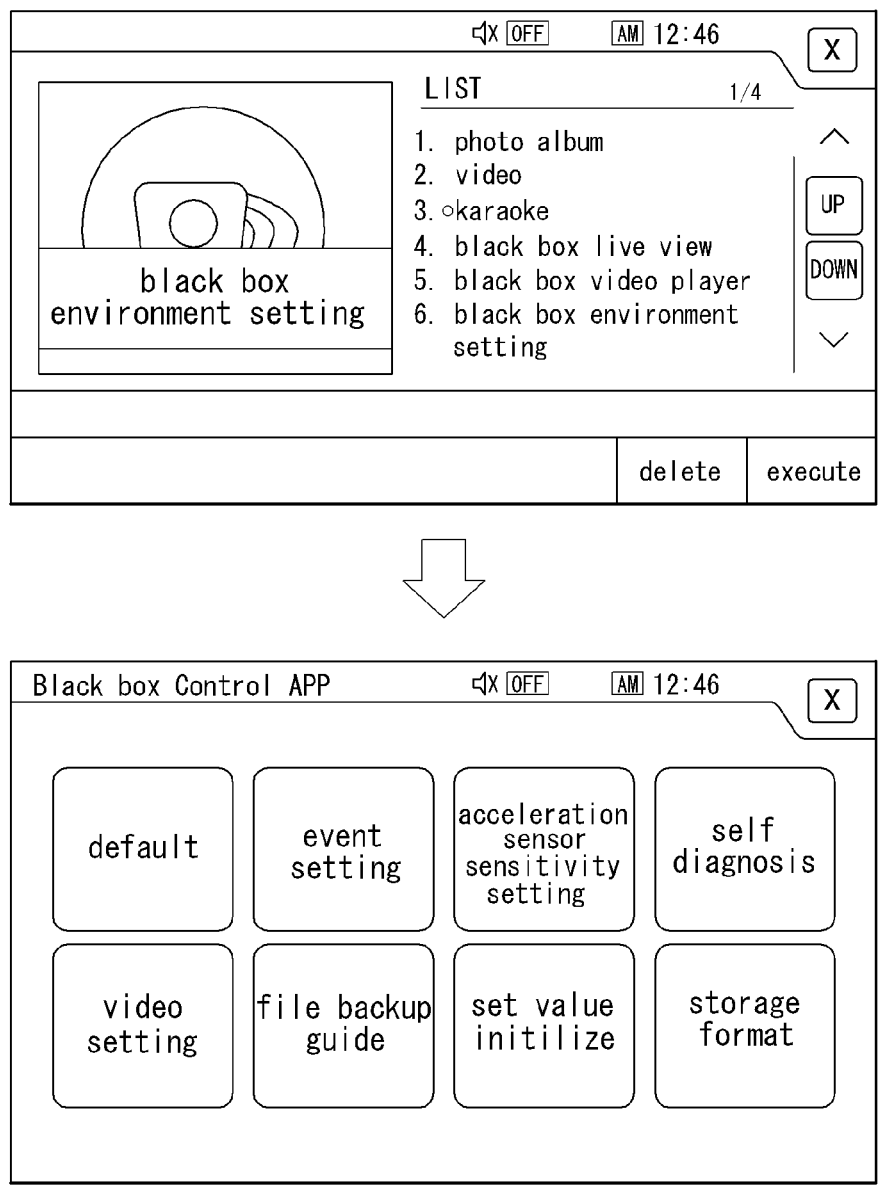
FIGS. 6 to 10 show user selection menus according to an embodiment of the present invention.

The first controller 170 of the vehicle navigation system 100 controls the display module 141 to display user selection menus, which are supportable by the vehicle navigation system 100 and the vehicle black box 200, in the form of a list, as shown in FIG. 6.

The list displays various user selection menu items such as a photo album, video, Karaoke, black box live view, black box video player, black box environment setting, etc. For example, when a menu item corresponding to the black box environment setting is selected, a black box control application program is executed and sub-men items such as default, event setting, acceleration sensor sensitivity setting, self-diagnosis, video setting, file backup guide, set value initialization, storage format, etc.

According to an embodiment of the present invention, when the possibility of a car accident is high, it is possible to record a camera video by increasing one or more of the quality, resolution and FPS of the recorded video. That is, there is provided a method for controlling video recording in the vehicle black box, which determines the possibility of a car accident on the basis of a variation in a value sensed by a sensor, for example, and changes the quality of a recorded camera video according to the possibility of a car accident.

Figure 7:
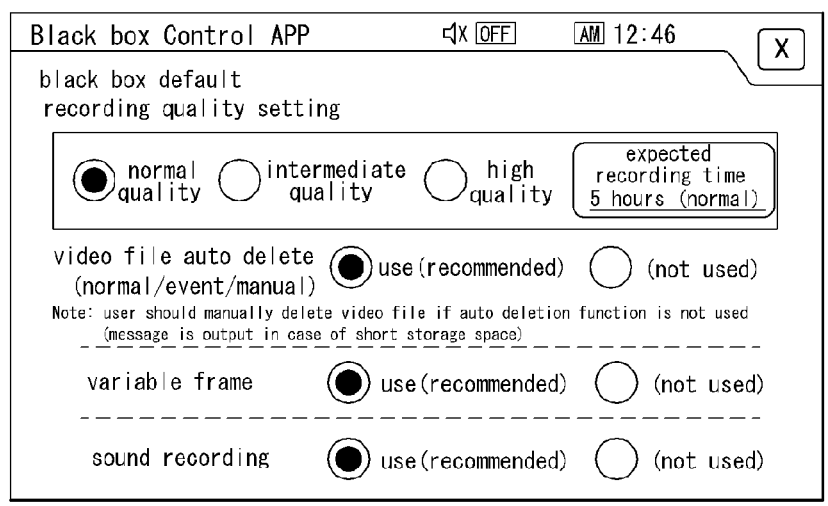

According to an embodiment of the present invention, when the sub-menu item corresponding to default shown in FIG. 6 is selected, for example, menu items for selecting normal quality, intermediate quality, high quality as the quality of a recorded video of the black box and menu items for selecting one of auto video file deletion, variable frame and sound recording are displayed, as shown in FIG. 7.

Figure 8:
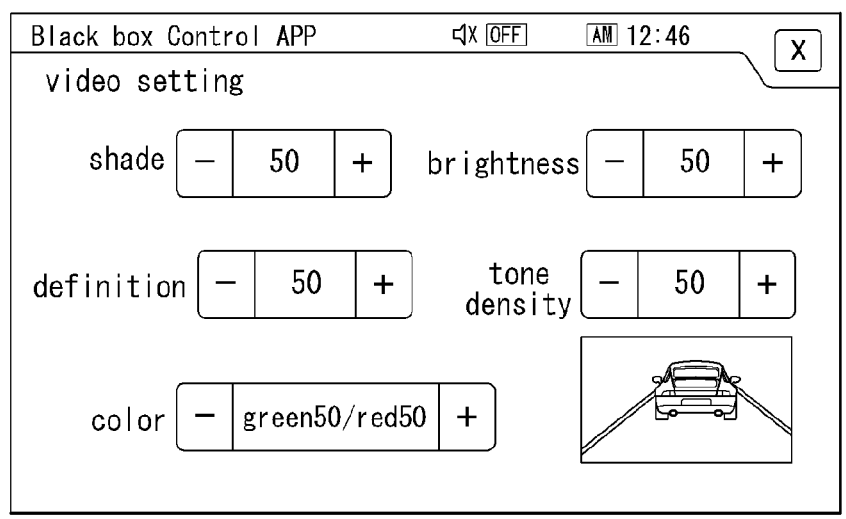

For example, when the sub-menu item corresponding to video setting shown in FIG. 6 is selected, menu items for selecting shade, brightness, definition, tone density, and color are displayed, as shown in FIG. 8. In this case, a video captured by the camera module 221 of the vehicle black box 200 is displayed on part of the menu screen shown in FIG. 8 such that a user may adjust the shade, brightness, etc. of the video while viewing the video.

Figure 9:
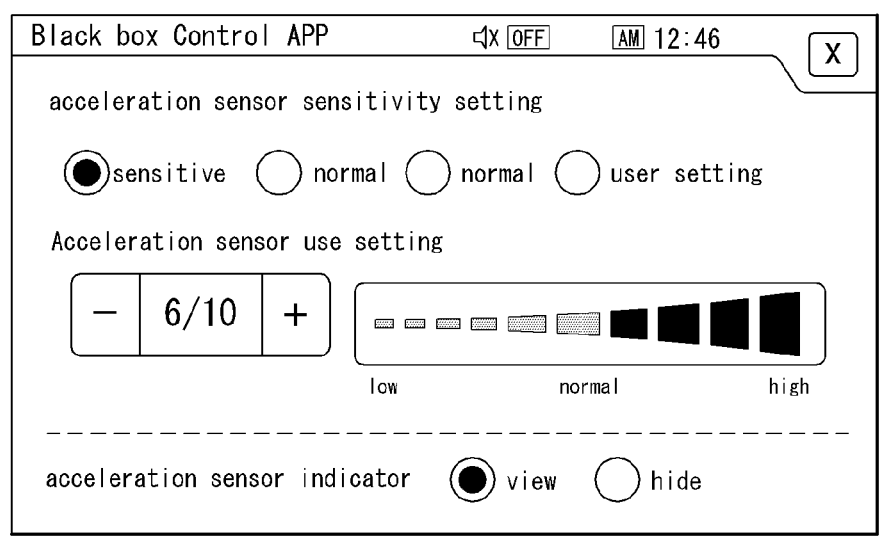

When the sub-menu item corresponding to acceleration sensor sensitivity setting shown in FIG. 6 is selected, menu items for adjusting the sensitivity of an acceleration sensor to a sensitive level, a normal level, an insensitive level, and a user setting level are displayed, as shown in FIG. 9. If the user setting level is selected, an adjustment button (+/−) and a bar-type indicator are displayed such that the user adjusts the sensitivity of the acceleration sensor using the adjustment button and the indicator. In addition, 'view' and 'hide' menu items for the acceleration sensor indicator are displayed.

Figure 10:
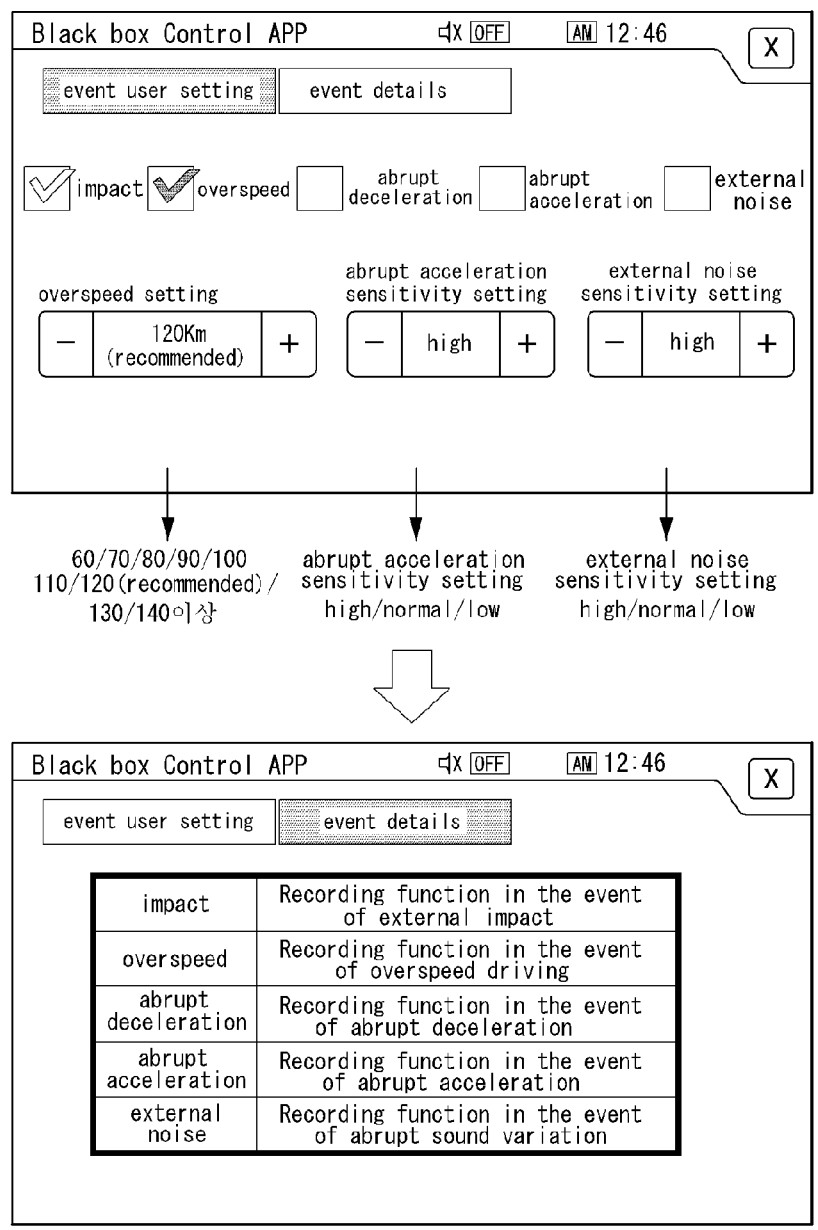

When the sub-menu item corresponding to event setting shown in FIG. 6 is selected, menu items of event user setting and event details are displayed, as shown in FIG. 10. The menu item corresponding to event user setting includes sub-menu items such as impact, overspeed, abrupt deceleration, abrupt acceleration, and external noise. In addition, adjustment buttons (+/−) for setting an overspeed velocity, abrupt acceleration sensitivity and external noise sensitivity are displayed such that the user adjusts the overspeed velocity, abrupt acceleration sensitivity and external noise sensitivity.

Upon selection of the menu item corresponding to event details, a message representing that a video is recorded in the second storage 250 of the vehicle black box 200 is displayed when an event according to impact, overspeed, abrupt deceleration, abrupt acceleration or external noise occurs.

When the user performs a normal event setting operation through the above-mentioned procedure, the first controller 170 of the vehicle navigation system transmits the above-mentioned set values to the second controller 270 of the vehicle black box or shares the set values with the second controller 270 of the vehicle black box.

The second controller 270 of the vehicle black box records a video captured by the camera module 221 in the storage 250 by adjusting the quality, resolution and FPS of the recorded video on the basis of the aforementioned event set values.

For example, when an event having a high possibility of an accident is generated, the second controller 270 of the vehicle black box records the video in the storage 250 by increasing at least one of the quality, resolution and FPS of the recorded video. When the event is cancelled, the second controller 270 of the vehicle black box records the video in the storage 250 by adjusting the quality, resolution and FPS of the recorded video to previously set quality, resolution and FPS.

When the event having a high possibility of an accident is generated, the second controller 270 of the vehicle black box records the video along with a microphone voice received through at least one of the first microphone module 123 of the vehicle navigation system and the second microphone module 223 of the vehicle black box.

In addition, the second controller 270 of the vehicle black box records the video along with position and map data output through the location data module 111 and the first storage 150 of the vehicle navigation system when the event having a high possibility of an accident is generated. The event may be detected by the first controller 170 of the vehicle navigation system and then information on the event may be transmitted to the second controller 270 of the vehicle black box.

Figure 11:
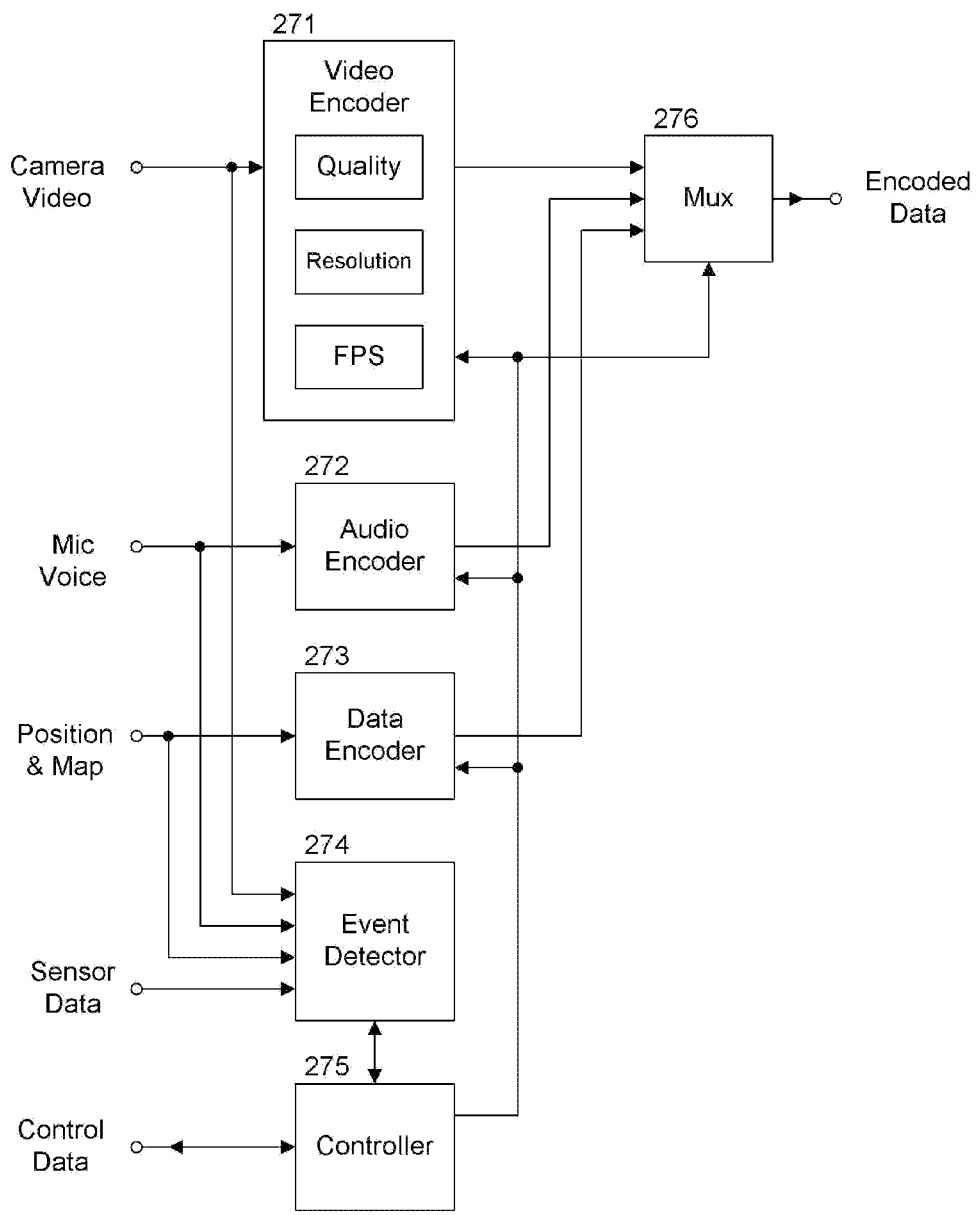
FIG. 11 illustrates a configuration of part of the vehicle block box according to an embodiment of the present invention.

FIG. 11 illustrates a configuration of an apparatus for controlling video recording in the vehicle black box according to an embodiment of the present invention. For example, the second controller 270 of the vehicle black box may include a video encoder 271, an audio encoder 272, a data encoder 273, an event detector 274, a controller 275, and a multiplexer 276.

The video encoder 271 variably adjusts the quality, resolution and FPS of a video captured by the camera module 221 and encodes the video into video data in a format suitable to be stored in the second storage 250 under the control of the controller 275. The video encoder 271 may be included in the camera module 221.

The audio encoder 272 encodes a microphone voice output from the second microphone module 223 into audio data in a format suitable to be stored in the second storage 250 under the control of the controller 275. The audio encoder 272 may be included in the second microphone module 223. Furthermore, the audio encoder 272 encodes a microphone voice output from the first microphone module 123 of the vehicle navigation system into audio data in a format suitable to be stored in the second storage 250.

The data encoder 273 encodes position and map data output from the location data module 111 and the first storage 150 of the vehicle navigation system into data in a format suitable to be stored in the second storage 250 under the control of the controller 275. The data encoder 273 may be included in the location data module 111 of the vehicle navigation system, for example.

The event detector 274 detects an event having a high possibility of an accident by analyzing at least one of a camera video, microphone voice, position and map data and sensor data. The event detector 274 may be included in the vehicle navigation system. In this case, the controller 275 may interface with the first controller 170 of the vehicle navigation system to detect the event.

If an acceleration value Va sensed by the 3-axis geomagnetic sensor and the 3-axis acceleration sensor included in the second motion sensing module 241, described above with reference to FIG. 4, exceeds a predetermined reference value Ref_Va, the event detector 274 determines that abrupt acceleration or abrupt deceleration occurs and detects an event having a high possibility of an accident. The reference value Ref_Va may be set to an arbitrary value adjusted by the user or set to a default value, which is set based on experimental results when the vehicle black box is manufactured.

Furthermore, the event detector 274 may check a speed limit set for a road section where the corresponding vehicle currently runs with reference to the position and map data, and then give the reference value a weight. For example, if the reference value is 50 for a road with a speed limit of 80 km/h, the reference value can be automatically adjusted to 45 by giving a weight of −10% to a reference value for a road with a speed limit of 60 km/h.

When the vehicle black box includes a GPS module, for example, the event detector 274 calculates acceleration of the vehicle using coordinates, speed and angle data output from the GPS module, and then detects an event having a high possibility of an accident when the calculated acceleration exceeds a predetermined reference value.

When the vehicle runs at high speed for longer than a predetermined reference time even though the vehicle runs at a constant velocity with low acceleration, for example, when the vehicle runs at a velocity of higher than 120 km/h for 10 minutes, the event detector 274 detects an event having a high possibility of an accident.

The event detector 274 receives and analyzes the position and map data and detects an event having a high possibility of an accident when the vehicle enters a black spot, a crossroad, an alley, a one-way zone, etc. regardless of the acceleration and whether or not the vehicle runs at a high velocity.

The event detector 274 analyzes the camera video and detects an event having a high possibility of an accident when a degree of motion of an external object or the number of moving external objects exceeds a predetermined reference value or when a neighbour vehicle attempts to cut in. The event detector 274 analyzes the camera video using various methods including a method of comparing camera videos captured in real time on a frame basis to detect motion vector components for moving objects.

Upon detection of the event having a high possibility of an accident through the above-mentioned various detection processes, the controller 275 controls the video encoder 271 to increase the quality of the camera video from normal quality to high quality, to increase the resolution of the camera video from normal resolution (e.g. m×n) to high resolution (e.g. (m+y)×(n+z)), or to increase the FPS of the camera video from a predetermined FPS (e.g. n) to a high FPS (e.g. n+m), as shown in FIG. 12.

When the event having a high possibility of an accident is detected, as described above, the controller 275 controls the audio encoder 272 to encode a microphone voice signal received through the second microphone module 223 or the first microphone module 123 of the vehicle navigation system into audio data in a format suitable to be recorded in the second storage 250.

In addition, the controller 275 controls the data encoder 273 to encode the position and map data output from the location data module 111 and the first storage 150 of the vehicle navigation system into data in a format suitable to be recorded in the second storage 250.

The video encoder 271, the audio encoder 272 and the data encoder 273 may be simultaneously controlled by the controller 275 to perform encoding operations, or the video encoder 271, the audio encoder 272 and the data encoder 273 may be selectively controlled by the controller 275. For example, the multiplexer 276 multiplexes the data encoded by the video encoder 271, the audio encoder 272 and the data encoder 273 on a packet basis and outputs a data stream corresponding to multiplexed video, audio and data packets to the second storage 250.

Figure 13:
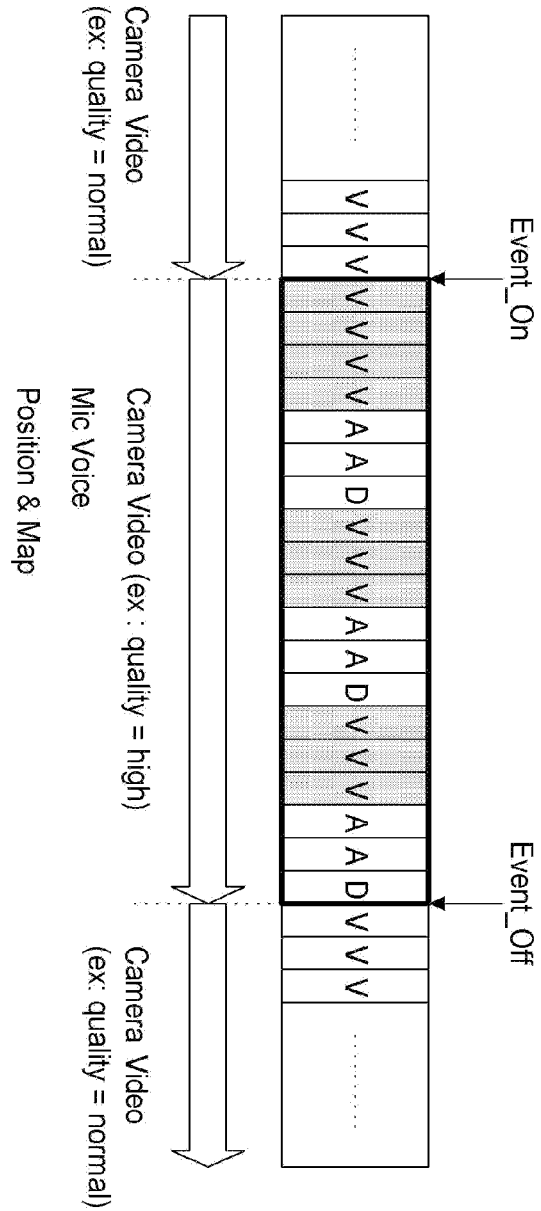
FIG. 13 illustrates a camera video, microphone voice, and position and map data according to an embodiment of the present invention.

For example, when the event is not generated, the multiplexer 276 outputs video data corresponding to the camera video having normal quality on a packet basis such that the video data is recorded in the second storage 250, as shown in FIG. 13.

When the event is generated, the multiplexer 276 multiplexes video data corresponding to the camera video with high quality, audio data corresponding to the microphone voice and the position and map data on a packet basis such that the multiplexed data is recorded in the second storage 250.

When the event is cancelled, the multiplexer 276 outputs video data corresponding to the camera video with normal quality on a packet basis such that the video data is recorded in the second storage 250. Accordingly, the limited capacity of the second storage 250 can be efficiently used.

In addition, the monitoring and storage performance of the vehicle black box can be improved by efficiently recording and storing a camera video, microphone voice and position and map data, which are obtained when the possibility of a car accident is high.

Figure 14:
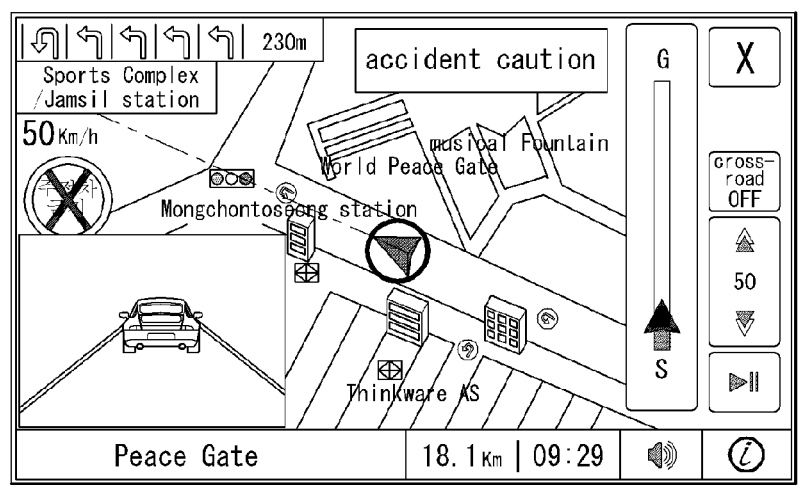
FIG. 14 illustrates display of a warning message according to an embodiment of the present invention.

When the event having a high possibility of an accident is generated, the controller 275 may control a warning message representing accident caution to be displayed on the display module 141 or control a warning sound to be generated through the audio output module 143 through interface with the first controller 170 of the vehicle navigation system, as shown in FIG. 14, so as to induce safety driving of the vehicle.

According to another embodiment of the present invention, when a traffic congestion having a high possibility of an accident is detected, it is possible to record a camera video by increasing at least one of the quality, resolution and FPS of the recoded video. That is, the present invention provides a method for controlling video recording in the vehicle black box, which analyzes an acquired camera video and changes the quality of the camera video when the camera video is recorded upon detection of a traffic congestion having a high possibility of an accident.

In this embodiment, when the user normally performs a desired environment setting operation through the aforementioned procedure described with reference to FIGS. 6 to 9, the first controller 170 of the vehicle navigation system transmits the aforementioned set values to the second controller 270 of the vehicle black box or shares the set values with the second controller 270 of the vehicle black box.

The second controller 270 of the vehicle black box records a video captured by the camera module 221 in the storage 250 by variably adjusting the quality, resolution and FPS of the recorded video on the basis of the aforementioned various set values.

For example, when a traffic congestion having a high possibility of an accident is detected from a route to a predetermined destination, the second controller 270 of the vehicle black box records the video in the storage 250 by increasing at least one of the quality, resolution and FPS of the recorded video. After a predetermined lapse of time or when the congestion is not detected, the second controller 270 of the vehicle black box records the video in the storage 250 by adjusting the quality, resolution and FPS of the recorded video to previously set quality, resolution and FPS.

When the traffic congestion having a high possibility of an accident is detected from the route, the second controller 270 of the vehicle black box records the video along with a microphone voice received through at least one of the first microphone module 123 of the vehicle navigation system and the second microphone module 223 of the vehicle black box.

In addition, the second controller 270 of the vehicle black box records the video along with position and map data output through the location data module 111 and the first storage 150 of the vehicle navigation system when the traffic congestion having a high possibility of an accident is detected from the route. The traffic congestion may be detected by the first controller 170 of the vehicle navigation system and then information on the traffic congestion may be transmitted to the second controller 270 of the vehicle black box.

Referring back to FIG. 11, the second controller 270 of the vehicle black box may include the video encoder 271, the audio encoder 272, the data encoder 273, a congestion detector 274, the controller 275, and the multiplexer 276.

The video encoder 271 variably adjusts the quality, resolution and FPS of a video captured by the camera module 221 and encodes the video into video data in a format suitable to be stored in the second storage 250 under the control of the controller 275. The video encoder 271 may be included in the camera module 221.

The audio encoder 272 encodes a microphone voice output from the second microphone module 223 into audio data in a format suitable to be stored in the second storage 250 under the control of the controller 275. The audio encoder 272 may be included in the second microphone module 223. Furthermore, the audio encoder 272 encodes a microphone voice output from the first microphone module 123 of the vehicle navigation system into audio data in a format suitable to be stored in the second storage 250.

The data encoder 273 encodes position and map data output from the location data module 111 and the first storage 150 of the vehicle navigation system into data in a format suitable to be stored in the second storage 250 under the control of the controller 275. The data encoder 273 may be included in the location data module 111 of the vehicle navigation system, for example.

The congestion detector 274 receives one or more of the camera video, microphone voice, position and map data and sensor data, and various types of traffic data such as TPEG data through the broadcast transmitting/receiving module 115 of the vehicle navigation system, described above with reference to FIG. 3.

The congestion detector 274 analyzes and combines the camera video, microphone voice, position and map data, sensor data, and traffic data to detect a traffic congestion having a high possibility of an accident from the route to the predetermined destination.

Figure 15:
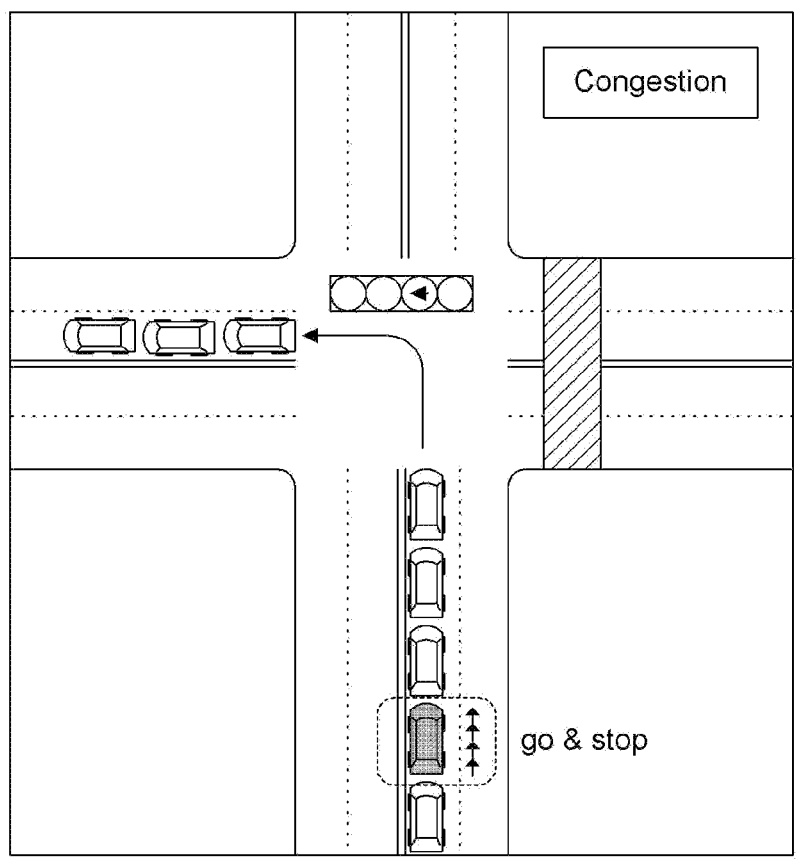
FIGS. 15, 16 and 17 are views for explaining detection of a traffic congestion according to embodiments of the present invention.

For example, as shown in FIG. 15, if the corresponding vehicle repeats a go-and-stop operation by more than a predetermined reference number of times in order to attempt to turn left at a crossroad on the route to the predetermined destination, the congestion detector 274 detects the current traffic state as a congestion.

Specifically, when many vehicles enter a crossroad in order to turn left at the yellow light indicating end of the left-turn signal, a car accident may occur. In this case, the congestion detector 274 receives sensor data output from the 3-axis geomagnetic sensor and the 3-axis acceleration sensor, for example, and detects the current traffic state as traffic congestion if the vehicle waiting at the crossroad repeats a go-and-stop operation by more than a predetermined number (e.g. 3) of times.

The congestion detector 274 detects the current traffic state as a congestion state when detecting the vehicle stopped at the crossroad by analyzing a video captured by the camera module 221.

Figure 16:
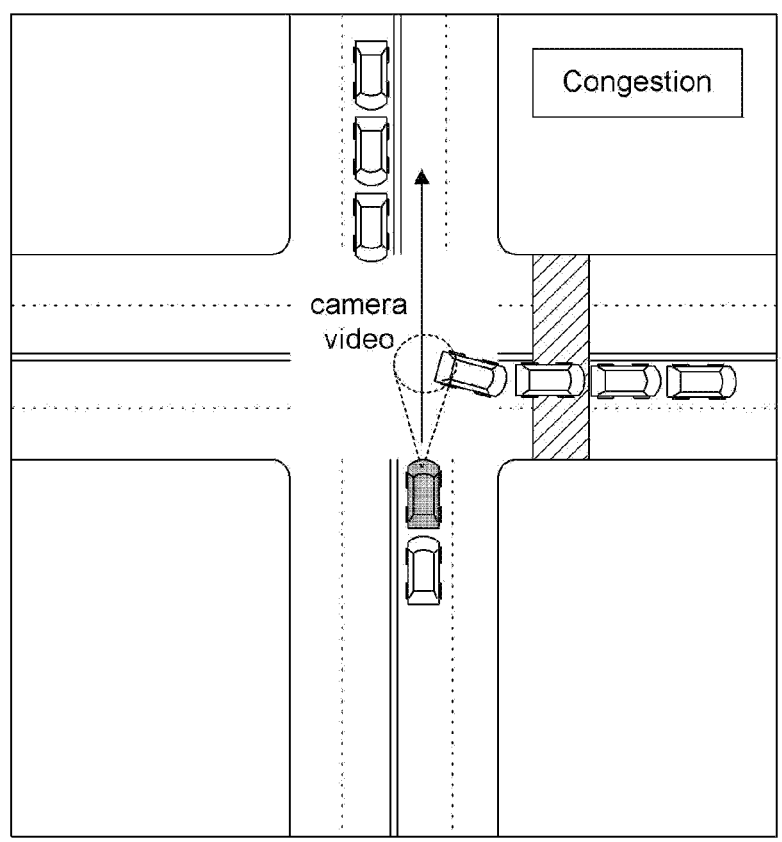

For example, when the camera module 221 photographs a forward view of the vehicle waiting to pass the crossroad, as shown in FIG. 16, the congestion detector 274 analyzes the video captured by the camera module 221 and, when the traffic is bumper to bumper at the crossroad, detects the current traffic state as a congestion state. The camera video may be analyzed using a known method of extracting a contour or an object image.

Upon reception of traffic data (e.g. TPEG data) through the broadcast transmitting/receiving module 115 of the vehicle navigation system, the congestion detector 274 detects congestion at the crossroad at which the vehicle stops. For example, as shown in FIG. 16, the congestion detector 274 can detect a congestion state in a diagonal direction of the crossroad and a congestion state in the right direction, which are not related to the route (e.g. lane) of the vehicle.

Figure 17:
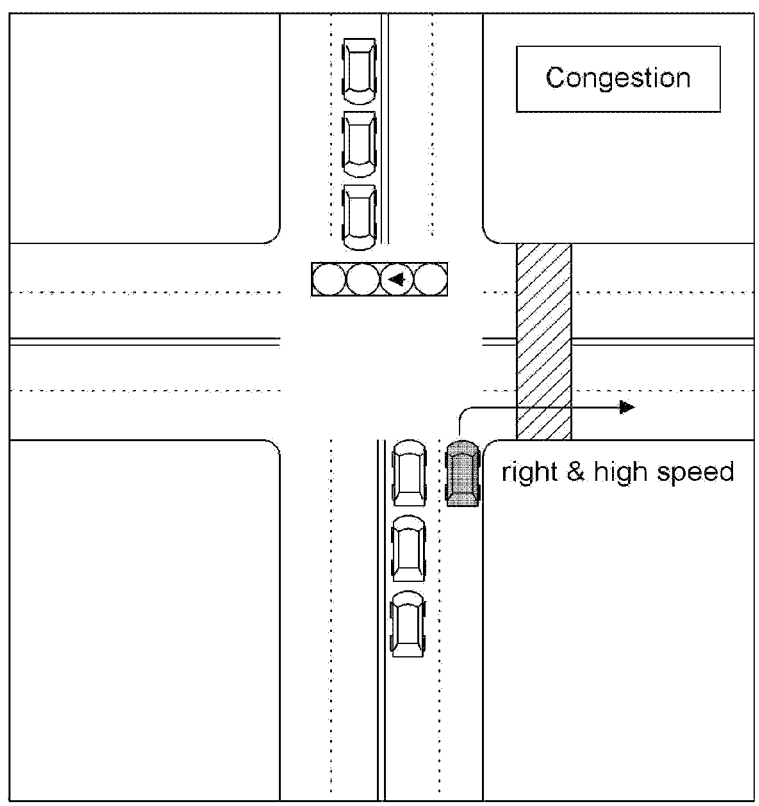

Furthermore, as shown in FIG. 17, the congestion detector 274 detects the current traffic state as a congestion state when the vehicle turns right to a direction deviated from the route to the predetermined destination and passes a crosswalk at higher than a specific speed (e.g. 40 km/h).

Upon detection of the congestion state through the above-mentioned procedure, the congestion detector 274 outputs a detection signal corresponding to the congestion state to the controller 275.

Upon reception of the detection signal, the controller 275 determines that the current traffic state has a high possibility of a car accident due to congestion. The congestion detector may be included in the first controller 170 of the vehicle navigation system, for example. In this case, the controller 275 receives the detection signal indicating the congestion state through an interface with the first controller 170 of the vehicle navigation system.

When the controller 275 determines that the possibility of an accident is high due to the traffic congestion, the controller 275 controls the video encoder 271 to increase the quality of the camera video from normal quality to high quality, to increase the resolution of the camera video from normal resolution (e.g. m×n) to high resolution (e.g. (m+y)×(n+z)), or to increase the FPS of the camera video from a predetermined FPS (e.g. n) to a high FPS (e.g. n+m), as shown in FIG. 12.

The controller 275 controls the audio encoder 272 to encode a microphone voice signal received through the second microphone module 223 or the first microphone module 123 of the vehicle navigation system into audio data in a format suitable to be recorded in the second storage 250.

In addition, the controller 275 controls the data encoder 273 to encode the position and map data output from the location data module 111 and the first storage 150 of the vehicle navigation system into data in a format suitable to be recorded in the second storage 250.

The video encoder 271, the audio encoder 272 and the data encoder 273 may be simultaneously controlled by the controller 275 to perform encoding operations, or the video encoder 271, the audio encoder 272 and the data encoder 273 may be selectively controlled by the controller 275. For example, the multiplexer 276 multiplexes the data encoded by the video encoder 271, the audio encoder 272 and the data encoder 273 on a packet basis and outputs a data stream corresponding to multiplexed video, audio and data packets to the second storage 250.

For example, when the traffic congestion is not detected, the multiplexer 276 outputs video data corresponding to the camera video having normal quality on a packet basis such that the video data is recorded in the second storage 250, as shown in FIG. 13.

When the traffic congestion is detected, the multiplexer 276 multiplexes video data corresponding to the camera video with high quality, audio data corresponding to the microphone voice and the position and map data on a packet basis such that the multiplexed data is recorded in the second storage 250.

After a predetermined lapse of time or when the traffic congestion is not detected, the multiplexer 276 outputs video data corresponding to the camera video with normal quality on a packet basis such that the video data is recorded in the second storage 250. Accordingly, the limited capacity of the second storage 250 can be efficiently used.

In addition, the monitoring and storage performance of the vehicle black box can be improved by efficiently recording and storing a camera video, microphone voice and position and map data, which are obtained when the possibility of a car accident is high.

When traffic congestion having a high possibility of an accident is detected, the controller 275 may control a warning message representing accident caution to be displayed on the display module 141 or control a warning sound to be generated through the audio output module 143 through interface with the first controller 170 of the vehicle navigation system, as shown in FIG. 14, so as to induce safety driving of the vehicle.

According to another embodiment of the present invention, there is provided a method for controlling video recording in the vehicle black box, which records a camera video by increasing one or more of the quality, resolution and FPS of the recorded video when an event of a special situation is detected according to one or more of a brightness level of the camera video, an input audio signal level, and an input audio frequency pattern.

According to another embodiment of the present invention, when the sub-menu item corresponding to default shown in FIG. 6 is selected, for example, menu items for selecting normal quality, intermediate quality, high quality as the quality of a recorded video of the black box and menu items for selecting one of auto video file deletion, variable frame and sound recording are displayed, as shown in FIG. 7.

For example, when the sub-menu item corresponding to video setting shown in FIG. 6 is selected, menu items for selecting shade, brightness, definition, tone density, and color are displayed, as shown in FIG. 8. In this case, a video captured by the camera module 221 of the vehicle black box 200 is displayed on part of the menu screen shown in FIG. 8 such that a user may adjust the shade, brightness, etc. of the video while viewing the video.

When the sub-menu item corresponding to acceleration sensor sensitivity setting shown in FIG. 6 is selected, menu items for adjusting the sensitivity of an acceleration sensor to a sensitive level, a normal level, an insensitive level, and a user setting level are displayed, as shown in FIG. 9. If the user setting level is selected, an adjustment button (+/−) and a bar-type indicator are displayed such that the user adjusts the sensitivity of the acceleration sensor using the adjustment button and the indicator. In addition, 'view' and 'hide' menu items for the acceleration sensor indicator are displayed.

When the sub-menu item corresponding to event setting shown in FIG. 6 is selected, menu items of event user setting and event details are displayed, as shown in FIG. 10. The menu item corresponding to event user setting includes sub-menu items such as impact, overspeed, abrupt deceleration, abrupt acceleration, and external noise. In addition, adjustment buttons (+/−) for setting an overspeed velocity, abrupt acceleration sensitivity and external noise sensitivity are displayed such that the user adjusts the overspeed velocity, abrupt acceleration sensitivity and external noise sensitivity.

Upon selection of the menu item corresponding to event details, a message representing that a video is recorded in the second storage 250 of the vehicle black box 200 is displayed when an event according to impact, overspeed, abrupt deceleration, abrupt acceleration or external noise occurs.

When the user performs a normal event setting operation through the above-mentioned procedure, the first controller 170 of the vehicle navigation system transmits the above-mentioned set values to the second controller 270 of the vehicle black box or shares the set values with the second controller 270 of the vehicle black box.

The second controller 270 of the vehicle black box records a video captured by the camera module 221 in the storage 250 by adjusting the quality, resolution and FPS of the recorded video on the basis of the aforementioned event set values.

For example, when an event is generated in a special situation in which the vehicle enters a busy road, a skid mark is generated, or right after the vehicle passes through a tunnel, the second controller 270 of the vehicle black box records the video in the storage 250 by increasing at least one of the quality, resolution and FPS of the recorded video. When the event is cancelled, the second controller 270 of the vehicle black box records the video in the storage 250 by adjusting the quality, resolution and FPS of the recorded video to previously set quality, resolution and FPS.

When the event is generated in the special situation, the second controller 270 of the vehicle black box records the video along with a microphone voice received through at least one of the first microphone module 123 of the vehicle navigation system and the second microphone module 223 of the vehicle black box.

In addition, the second controller 270 of the vehicle black box records the video along with position and map data output through the location data module 111 and the first storage 150 of the vehicle navigation system when the event is generated in the aforementioned special situation. The event may be detected by the first controller 170 of the vehicle navigation system and then information on the event may be transmitted to the second controller 270 of the vehicle black box.

Referring back to FIG. 11, the second controller 270 of the vehicle black box may include the video encoder 271, the audio encoder 272, the data encoder 273, the event detector 274, the controller 275, and the multiplexer 276.

The video encoder 271 variably adjusts the quality, resolution and FPS of a video captured by the camera module 221 and encodes the video into video data in a format suitable to be stored in the second storage 250 under the control of the controller 275. The video encoder 271 may be included in the camera module 221.

The audio encoder 272 encodes a microphone voice output from the second microphone module 223 into audio data in a format suitable to be stored in the second storage 250 under the control of the controller 275. The audio encoder 272 may be included in the second microphone module 223. Furthermore, the audio encoder 272 encodes a microphone voice output from the first microphone module 123 of the vehicle navigation system into audio data in a format suitable to be stored in the second storage 250.

The data encoder 273 encodes position and map data output from the location data module 111 and the first storage 150 of the vehicle navigation system into data in a format suitable to be stored in the second storage 250 under the control of the controller 275. The data encoder 273 may be included in the location data module 111 of the vehicle navigation system, for example.

The event detector 274 detects an event in a special situation in which the vehicle enters a busy road or a skid mark is generated, or right after the vehicle passes through a tunnel by analyzing at least one of a camera video, microphone voice, position and map data and sensor data. The event detector 274 may be included in the vehicle navigation system. In this case, the controller 275 may interface with the first controller 170 of the vehicle navigation system to detect the event.

If an acceleration value Va sensed by the 3-axis geomagnetic sensor and the 3-axis acceleration sensor included in the second motion sensing module 241, described above with reference to FIG. 4, exceeds a predetermined reference value Ref_Va, the event detector 274 determines that abrupt acceleration or abrupt deceleration occurs and generates an event that signals vehicle collision. The reference value Ref_Va may be set to an arbitrary value adjusted by the user or set to a default value, which is set based on experimental results when the vehicle black box is manufactured.

Furthermore, the event detector 274 detects an event of a special situation right after the vehicle passes through a tunnel, for example, by analyzing the brightness level of the camera video. If the vehicle enters a tunnel, as shown in FIG. 18, the brightness level of the camera video becomes remarkably lower than a predetermined reference brightness level Y_Ref.

When the vehicle passes through the tunnel after a predetermined time (e.g. 3 seconds), the brightness level of the camera video abruptly increases to higher than the predetermined reference brightness level. Accordingly, the event detector 274 detects the event of the special situation right after the vehicle passes through the tunnel by analyzing the abruptly varying brightness level of the camera video.

Furthermore, the event detector 274 detects an event of a special situation in which the vehicle enters a busy road by analyzing the level of an audio signal input through a microphone. For example, if the vehicle runs on an uncrowded road, as shown in FIG. 19, the level of the audio signal input through the microphone does not exceed a predetermined reference audio level A_Ref or does not maintain a level higher than the predetermined reference audio level A_Ref for longer than a predetermined time (e.g. T_Ref=3 seconds) even though the level of the audio signal input through the microphone exceeds the predetermined reference audio level A_Ref.

On the other hand, when the vehicle enters a busy road generating considerable noise, such as a crossroad, as shown in FIG. 19, the level of an audio signal input through the microphone exceeds the predetermined reference audio level A_Ref and is maintained for longer than the predetermined time T_Ref. Accordingly, the event detector 174 detects the event of the special situation in which the vehicle enters the busy road by analyzing the level of the audio signal input through the microphone.

The event detector 274 detects an event of a special situation in which a skid mark is generated due to crash stop of the vehicle by analyzing the frequency pattern of an audio signal input through the microphone. For example, when a skid mark is generated due to crash stop of the vehicle, as shown in FIG. 20, the level of the audio signal input through the microphone abruptly exceeds the predetermined reference audio level A_Ref and the frequency pattern of the audio signal according to crash stop is detected.

For example, the above-mentioned specific frequency pattern is an experimental result value previously stored through a sudden brake performance test and may be stored in a non-volatile memory (not shown) such as a flash memory or an EEPROM.

Figure 20:
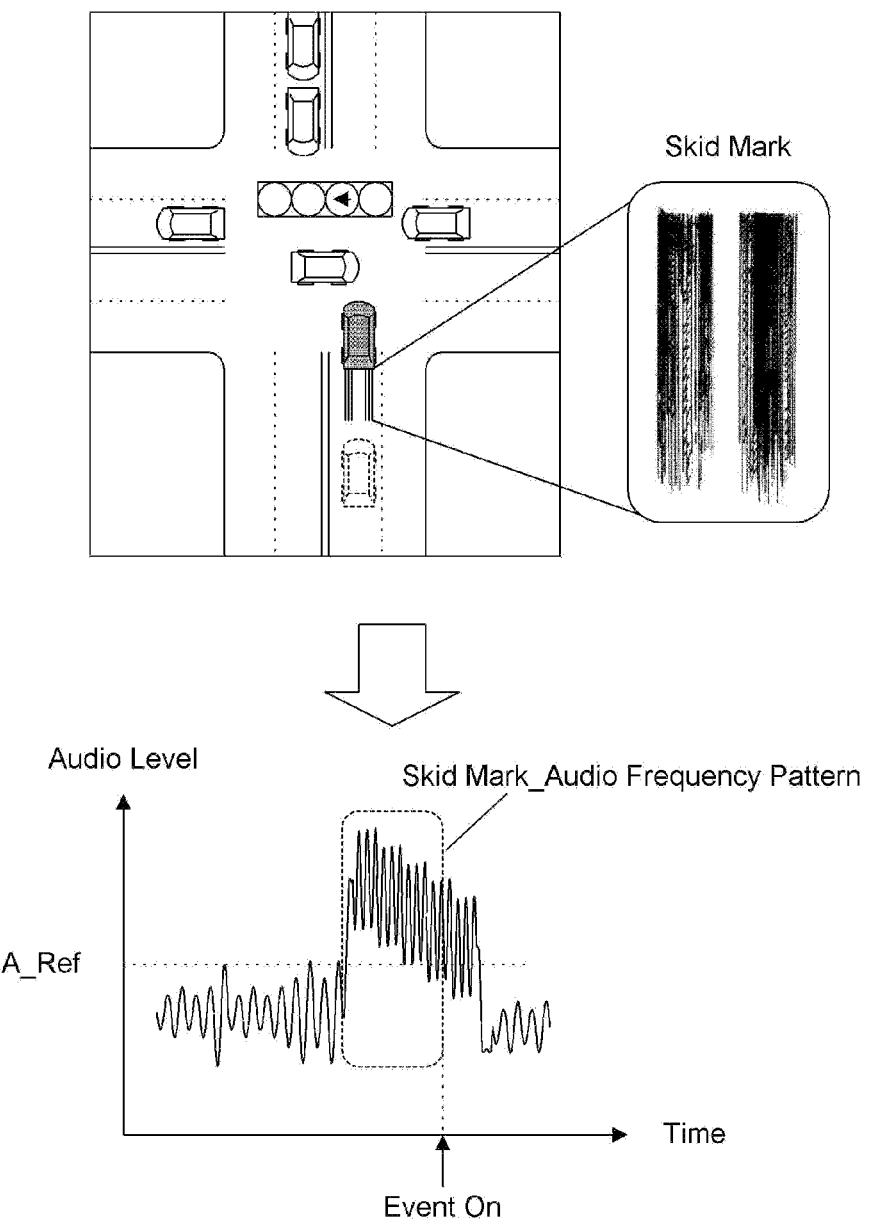

In a state that a specific frequency pattern (e.g. skid mark audio frequency pattern) having a high frequency component corresponding to a sudden noise generated in the event of sudden stop of the vehicle, as shown in FIG. 20, is stored in advance, the event detector 274 detects an event of a special situation in which a skid mark is generated due to sudden stop of the vehicle when an audio signal frequency pattern corresponding to the specific frequency pattern is detected.

Upon detection of an event of a special situation in which the vehicle enters a busy road or a skid mark is generated, or right after the vehicle passes through a tunnel through the above-mentioned various detection processes, the controller 275 controls the video encoder 271 to increase the quality of the camera video from normal quality to high quality, to increase the resolution of the camera video from normal resolution (e.g. m×n) to high resolution (e.g. (m+y)×(n+z)), or to increase the FPS of the camera video from a predetermined FPS (e.g. n) to a high FPS (e.g. n+m), as shown in FIG. 12.

When the event of the special situation in which the vehicle enters a busy road or a skid mark is generated, or right after the vehicle passes through a tunnel, as described above, the controller 275 controls the audio encoder 272 to encode a microphone voice signal received through the second microphone module 223 or the first microphone module 123 of the vehicle navigation system into audio data in a format suitable to be recorded in the second storage 250.

In addition, the controller 275 controls the data encoder 273 to encode the position and map data output from the location data module 111 and the first storage 150 of the vehicle navigation system into data in a format suitable to be recorded in the second storage 250.

The video encoder 271, the audio encoder 272 and the data encoder 273 may be simultaneously controlled by the controller 275 to perform encoding operations, or the video encoder 271, the audio encoder 272 and the data encoder 273 may be selectively controlled by the controller 275. For example, the multiplexer 276 multiplexes the data encoded by the video encoder 271, the audio encoder 272 and the data encoder 273 on a packet basis and outputs a data stream corresponding to multiplexed video, audio and data packets to the second storage 250.

For example, when the event is not generated, the multiplexer 276 outputs video data corresponding to the camera video having normal quality on a packet basis such that the video data is recorded in the second storage 250, as shown in FIG. 13.

When the event is generated, the multiplexer 276 multiplexes video data corresponding to the camera video with high quality, audio data corresponding to the microphone voice and the position and map data on a packet basis such that the multiplexed data is recorded in the second storage 250.

When the event is cancelled, the multiplexer 276 outputs video data corresponding to the camera video with normal quality on a packet basis such that the video data is recorded in the second storage 250. Accordingly, the limited capacity of the second storage 250 can be efficiently used.

In addition, the monitoring and storage performance of the vehicle black box can be improved by efficiently recording and storing a camera video, microphone voice and position and map data, which are obtained in the special situation in which the vehicle enters a busy road or a skid mark is generated, or right after the vehicle passes through a tunnel.

When the event of the aforementioned special situation is generated, the controller 275 may control a warning message representing accident caution to be displayed on the display module 141 or control a warning sound to be generated through the audio output module 143 through interface with the first controller 170 of the vehicle navigation system, as shown in FIG. 14, so as to induce safety driving of the vehicle.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for controlling video recording in a black box for a vehicle, the apparatus comprising:
   a storage configured to store a video including images of a driving vehicle; and
   a controller for configured to obtain an accident possibility for the vehicle and variably adjust at least one of a quality, a resolution and a frame per second (FPS) of the video according to the obtained accident possibility, wherein, when the accident possibility is within the predetermined range, the controller is configured to re-adjust the adjusted quality, resolution and FPS to previous values before the accident possibility exceeds the predetermined range, and records the video according to the re-adjusted quality, resolution and FPS.

2. The apparatus of claim 1, wherein the controller is configured to obtain the accident possibility by considering at least one of a velocity and an acceleration of the vehicle.

3. The apparatus of claim 2, wherein the controller is configured to obtain a predetermined reference value that varies according to road section in consideration of map data regarding the road section where the vehicle is currently located and obtain the accident possibility by comparing the velocity of the vehicle with the predetermined reference value.

4. The apparatus of claim 1, wherein the controller is configured to obtain the accident possibility in consideration of the type of the road section where the vehicle is currently located.

5. The apparatus of claim 1, wherein the controller is configured to obtain the accident possibility in consideration of whether a traffic congestion occurs on a driving route of the vehicle.

6. The apparatus of claim 5, wherein the controller is further configured to analyze the video and determine whether the traffic congestion occurs by considering the analyzed result.

7. The apparatus of claim 6, wherein the controller is configured to determine whether the traffic congestion occurs by considering a motion of an object included in the video into account.

8. The apparatus of claim 5, wherein the controller is configured to determine whether the traffic congestion occurs in consideration of at least one of an acceleration pattern of the vehicle according to time and a velocity pattern of the vehicle according to time.

9. The apparatus of claim 1, wherein the controller is configured to obtain the accident possibility in consideration of a brightness level of the video, an input audio signal level and an input audio frequency level.

10. The apparatus of claim 9, wherein the controller is configured to obtain the accident possibility on the basis of whether a variation in the brightness level of the video meets a predetermined reference value.

11. The apparatus of claim 9, wherein the controller is configured to obtain the accident possibility on the basis of whether the input audio frequency pattern meets a predetermined reference pattern.

12. The apparatus of claim 9, wherein the controller is configured to obtain the accident possibility on the basis of whether the input audio signal level meets a predetermined reference level.

13. The apparatus of claim 1, wherein, when the accident possibility exceeds a predetermined range, the controller is configured to adjust at least one of the quality, the resolution and the FPS of the video on the basis of a predetermined value and record the video according to the adjusted quality, resolution and FPS.

14. The apparatus of claim 1, wherein the controller is configured to store obtained audio data in the storage when the accident possibility exceeds a predetermined range.

15. A method for controlling video recording in a black box for a vehicle in which the black box contains a storage device and a controller, the method comprising:
   storing a video including images of a driving vehicle in the storage device; and
   obtaining the accident possibility with the vehicle; and
   variably adjusting at least one of a quality, a resolution and a FPS of the video according to the obtained accident possibility in the controller, wherein, when the accident possibility is within the predetermined range, the controller is configured to re-adjust the adjusted quality, resolution and FPS to previous values before the accident possibility exceeds the predetermined range, and records the video according to the re-adjusted quality, resolution and FPS.

16. The method of claim 15, wherein the obtaining of the accident possibility comprises obtaining the accident possibility by considering at least one of a velocity and an acceleration of the vehicle.

17. The method of claim 15, wherein the obtaining of the accident possibility comprises obtaining the accident possibility in consideration of a type of a road section where the vehicle is currently located.

18. The method of claim 15, wherein the obtaining of the accident possibility comprises obtaining the accident possibility in consideration of a brightness level of the video, an input audio signal level and an input audio frequency level.

* * * * *